(12) United States Patent
Schell et al.

(10) Patent No.: US 10,584,643 B2
(45) Date of Patent: Mar. 10, 2020

(54) METHOD FOR OPERATING A SUPPLY ASSEMBLY FOR SUPPLYING FUEL GAS AND INERT MEDIA TO A GAS TURBINE COMBUSTOR, SUCH SUPPLY ASSEMBLY AND A GAS TURBINE COMPRISING SUCH SUPPLY ASSEMBLY

(71) Applicant: ANSALDO ENERGIA SWITZERLAND AG, Baden (CH)

(72) Inventors: Susanne Renate Schell, Baden (CH); Martin Liebau, Rütihof (CH)

(73) Assignee: Ansaldo Energia Switzerland AG, Baden (CH)

( * ) Notice: Subject to any disclaimer, the term of this patent is extended or adjusted under 35 U.S.C. 154(b) by 210 days.

(21) Appl. No.: 15/855,270

(22) Filed: Dec. 27, 2017

(65) Prior Publication Data
US 2018/0187609 A1    Jul. 5, 2018

(30) Foreign Application Priority Data

Dec. 30, 2016   (EP) .................................. 16207566

(51) Int. Cl.
| | |
|---|---|
| *F02C 9/26* | (2006.01) |
| *F02C 3/30* | (2006.01) |
| *F02C 7/232* | (2006.01) |
| *F01D 21/00* | (2006.01) |

(Continued)

(52) U.S. Cl.
CPC ................ *F02C 9/26* (2013.01); *F01D 21/00* (2013.01); *F02C 3/30* (2013.01); *F02C 7/222* (2013.01); *F02C 7/232* (2013.01); *F23R 3/28* (2013.01); *F05D 2260/602* (2013.01); *F05D 2270/31* (2013.01)

(58) Field of Classification Search
CPC .... F02C 9/32; F02C 9/26; F02C 9/263; F02C 7/22; F02C 7/222; F02C 7/232; F02C 3/30; F05D 2270/31; F23R 3/28; F01D 21/00

See application file for complete search history.

(56) References Cited

U.S. PATENT DOCUMENTS

| | | | |
|---|---|---|---|
| 2012/0232768 A1* | 9/2012 | Nenmeni ................... | F02C 9/40 701/100 |
| 2013/0067925 A1* | 3/2013 | Bothien .................... | F23R 3/36 60/772 |
| 2013/0186057 A1 | 7/2013 | Shanmugam et al. | |

FOREIGN PATENT DOCUMENTS

| | | |
|---|---|---|
| EP | 2 497 924 A1 | 9/2012 |
| EP | 2 620 615 A1 | 7/2013 |
| JP | 11-166424 A | 6/1999 |

OTHER PUBLICATIONS

European Search Report dated Jun. 26, 2017.

* cited by examiner

*Primary Examiner* — Andrew H Nguyen
*Assistant Examiner* — Stephanie Cheng
(74) *Attorney, Agent, or Firm* — Buchanan Ingersoll & Rooney PC

(57) ABSTRACT

A method for operating a supply assembly configured for supplying fuel gas and an inert purge media to a gas turbine combustor, the method including supplying fuel gas in a fuel gas circuit with an upper flow rate; reducing the fuel gas flow rate in the fuel gas circuit from the upper flow rate to a lower flow rate; stopping the supply of the fuel gas in the fuel gas circuit; and starting the supply of the inert purge media in the inert purge media circuit, wherein the starting (Continued)

is performed before the stopping to have a temporary parallel supply of fuel gas and of inert purge media to a fuel distribution system.

14 Claims, 3 Drawing Sheets

(51) Int. Cl.
*F23R 3/28* (2006.01)
*F02C 7/22* (2006.01)

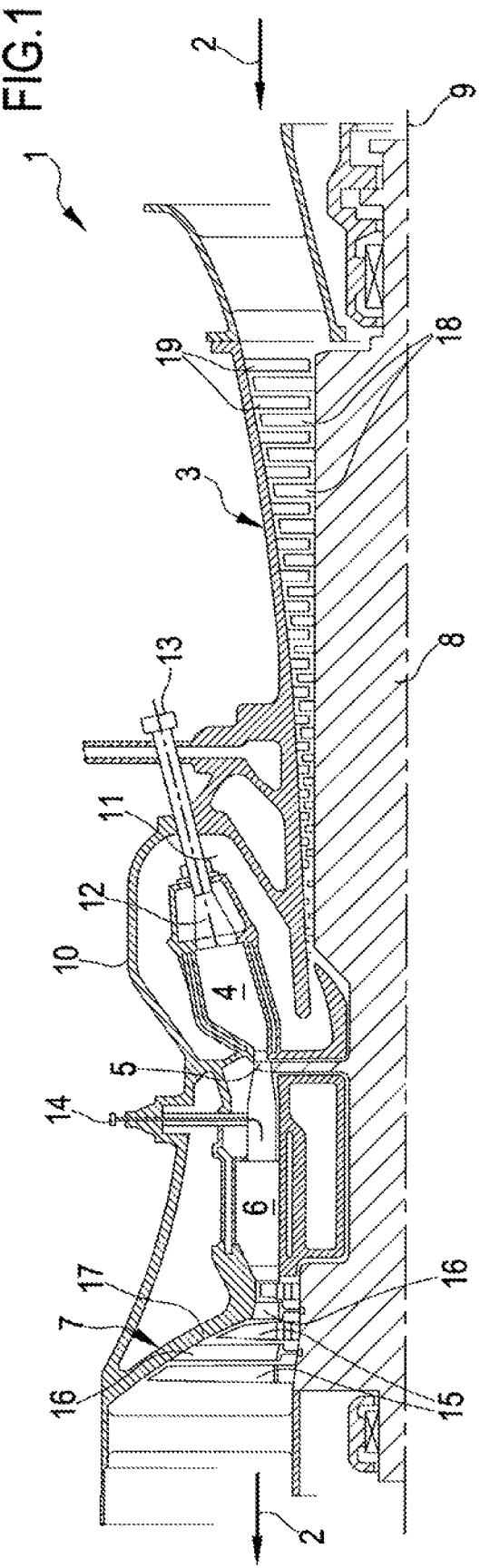
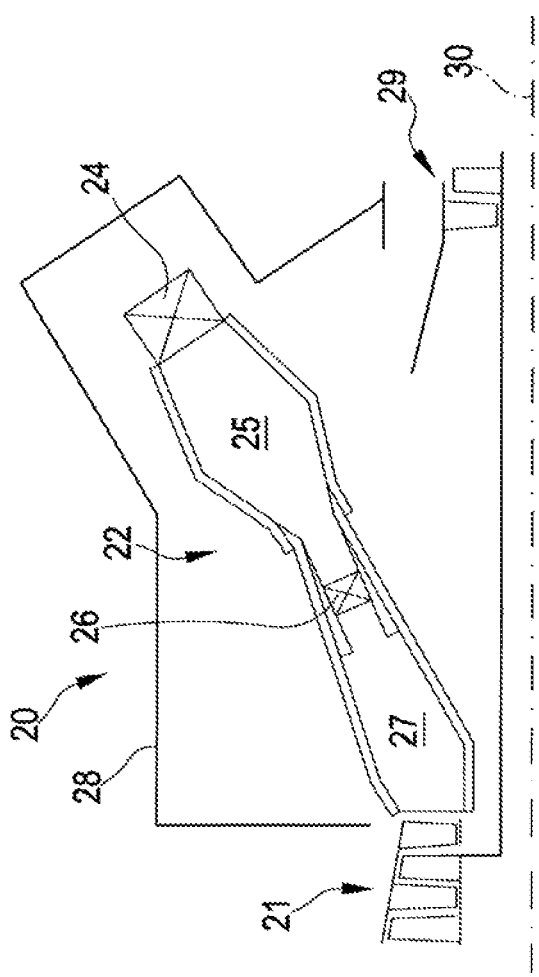
FIG.1
FIG.2

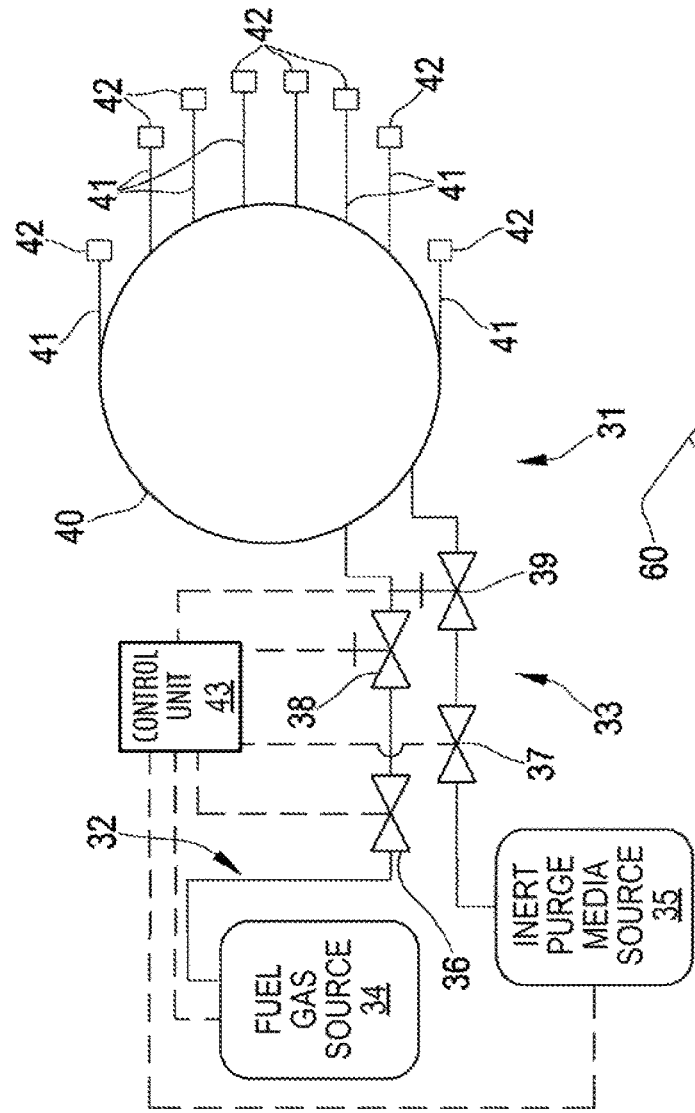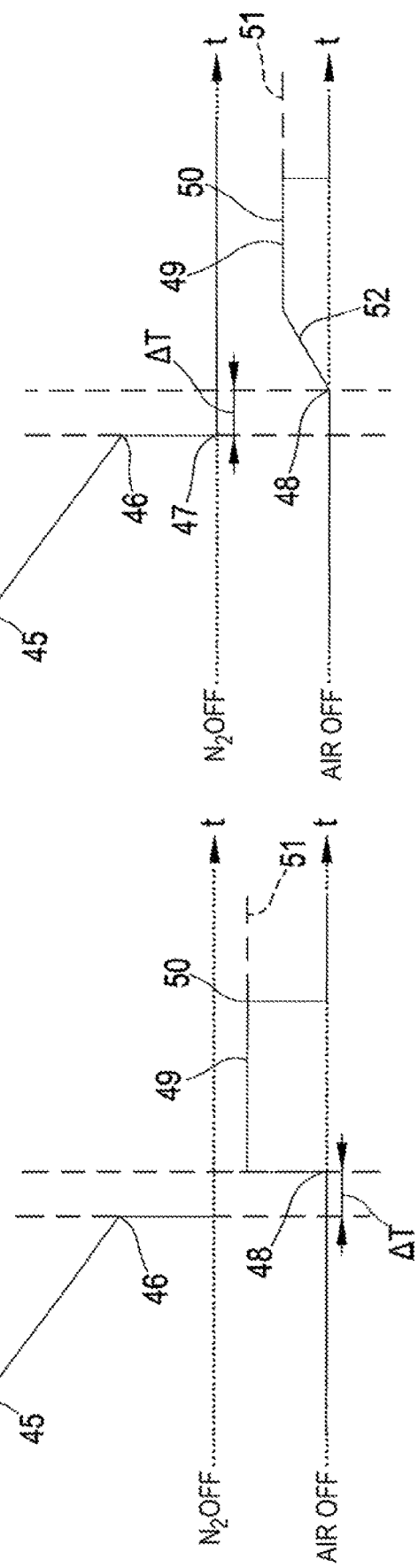

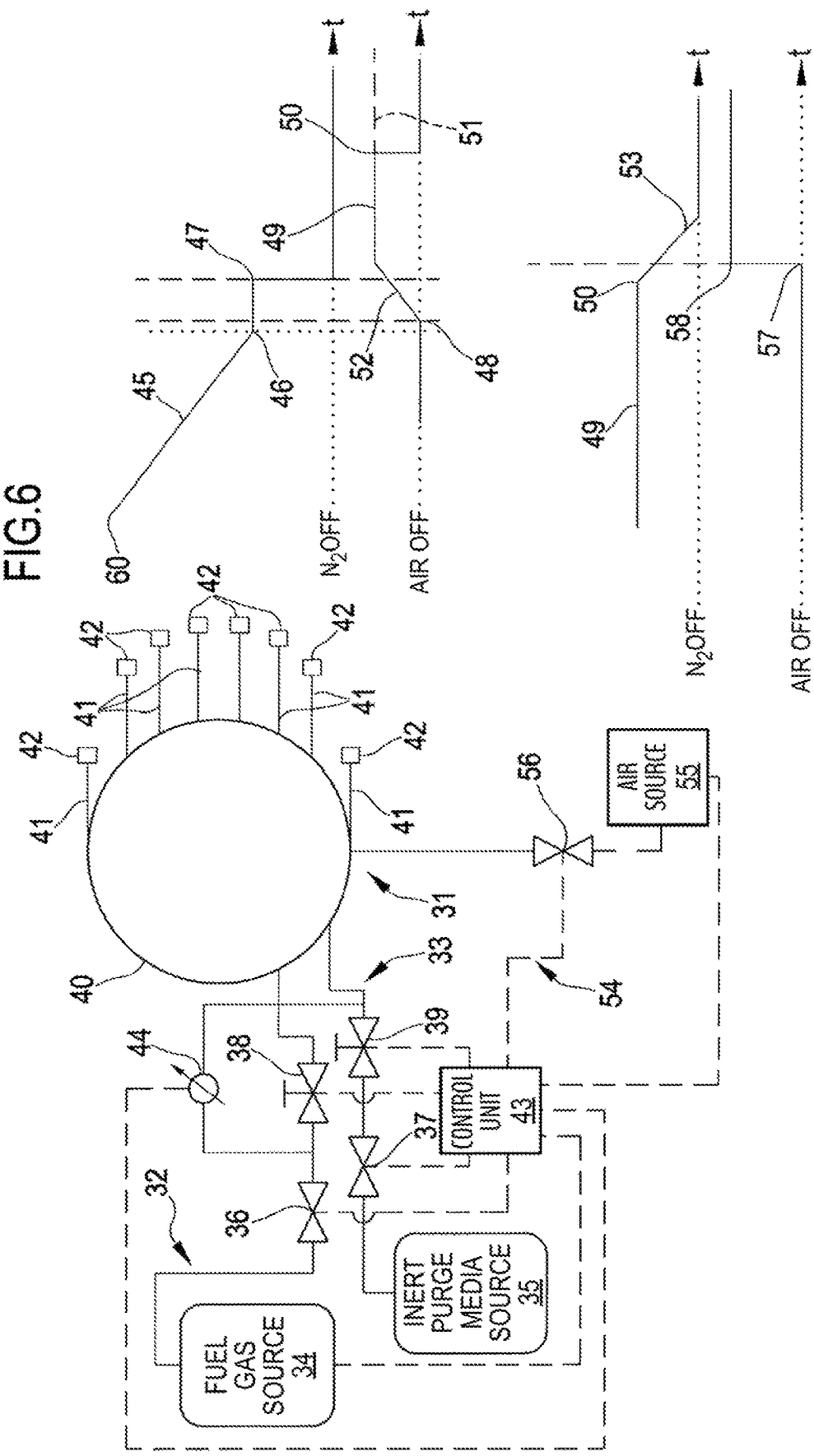

METHOD FOR OPERATING A SUPPLY ASSEMBLY FOR SUPPLYING FUEL GAS AND INERT MEDIA TO A GAS TURBINE COMBUSTOR, SUCH SUPPLY ASSEMBLY AND A GAS TURBINE COMPRISING SUCH SUPPLY ASSEMBLY

PRIORITY CLAIM

This application claims priority from European Patent Application No. 16207566.7 filed on Dec. 30, 2016, the disclosure of which is incorporated by reference.

FIELD OF THE INVENTION

The present invention relates to a method for operating a supply assembly configured for supplying fuel gas and an inert media as a purge flow to a gas turbine combustor, in particular to a plurality of can combustors.

Moreover, the present invention relates to a supply assembly configured for performing the above mentioned method and to a gas turbine comprising such supply assembly.

DESCRIPTION OF PRIOR ART

As known, a gas turbine power plant (in the following only gas turbine) comprises a rotor provided with an upstream compressor, at least a combustion chamber and at least a downstream turbine. The terms "downstream" and "upstream" refer to the direction of the main gas flow passing through the gas turbine from the compressor to the turbine. In particular, the compressor comprises an inlet supplied with air and a plurality of blades and vanes configured for compressing the air entering the compressor. The compressed air leaving the compressor flows into a plenum and from there into a burner. Inside the burner, the compressed air is mixed with at least one fuel. The mixture of such fuel and the compressed air flows into a combustion chamber where this mixture is combusted. The resulting hot gas leaves the combustor chamber and expands in the turbine performing work on the rotor.

In order to achieve a high efficiency, a high turbine inlet temperature is required. However, due to this high temperature, high NOx emission levels are generated.

In order to reduce these emissions and to increase operational flexibility, today is known a particular kind of gas turbines called "sequential" gas turbine.

In general, a sequential gas turbine comprises two combustion chambers in series. According to a first kind of sequential gas turbines, the two combustion chambers are physically separated by a stage of turbine blades, called high pressure turbine.

Today is known a second kind of sequential gas turbines not provided with the high pressure turbine. According to this kind of gas turbine, the two combustion chambers are integrated in a single casing, for instance a can-shaped combustor. Of course, this kind of gas turbine is provided with a plurality of can combustors arranged as a ring around the turbine axis.

These kinds of gas turbines, as other kinds not mentioned, comprise a fuel gas circuit configured for supplying fuel gas to a combustor from a fuel gas source. Following the fuel gas flow, the fuel gas circuit comprises a fuel gas source, a shut off valve, a control valve, a fuel distribution system and a plurality of fuel lines connected to the combustor that, for instance, can be a single annular shaped combustor or a plurality of can shaped combustors arranged around the turbine axis.

The above mentioned fuel gas circuit is part of a supply assembly that also comprises an inert purge media circuit and, sometimes, an air circuit. The inert purge media circuit and the air circuit are downstream connected to the same fuel distribution system fed by the fuel gas circuit. Following the inert purge media flow, the inert purge media circuit comprises an inert purge media source, a shut off valve and, sometimes, a control valve.

According to the prior art practice, the inert purge media is supplied to the fuel distribution system when the fuel stages are shut on/off during the gas turbine operation. In particular, it is today known to supply an inert purge media to the fuel distribution system prior the introduction of the fuel gas. This procedure avoids the generation of chemical reaction inside the fuel distribution system. Moreover, it is today known to supply an inert purge media to the fuel distribution system after the closing of the fuel gas circuit in order to prevent chemical reaction inside the fuel distribution system. Usually, nitrogen is used as inert purge media.

Unfortunately, today the transfer from the fuel gas to the inert purge media operation affects the combustor stability. Indeed, according to the prior art practice (that will be explained in details in the description of the attached drawings 4 and 5) high sudden thermal power swings occur inside the fuel distribution system after the closing of the gas fuel circuit. The resulting sudden heat release can damage the gas turbine hardware up to conditions that fuel gas leakages occur.

DISCLOSURE OF THE INVENTION

Accordingly, a primary object of the present invention is to provide an alternative method for operating a supply assembly configured for supplying fuel gas and an inert media as a purge flow to a gas turbine combustor, wherein such method allows to overcome the prior art drawbacks as foregoing described.

In order to achieve the objective mentioned above, the present invention provides a method for operating a supply assembly configured for supplying fuel gas and an inert purge media to a gas turbine combustor. In particular, the present invention provides a method for realizing a safe transfer from gaseous fuel to an inert purge media. Therefore, the method comprises the steps of:

a) providing a supply assembly comprising:
  a fuel distribution system connected to at least a combustor; wherein the fuel distribution system comprises a plurality of fuel lines for supplying the fuel to a single combustor or a plurality of combustors, preferably a plurality of can combustors;
  a fuel gas circuit and an inert purge media circuit connecting respectively a fuel gas source and an inert purge media source to the fuel distribution system; wherein the fuel gas circuit is provided with a fuel gas shut off valve and a fuel gas control valve and the inert purge media circuit is provided with an inert purge media shut off valve;
  a control unit configured for controlling the fuel gas flow rate in the fuel gas circuit and the inert purge media flow rate in the inert purge media circuit;

b) supplying the fuel gas in the fuel gas circuit with an upper flow rate;

c) reducing, in particular ramping down, the fuel gas flow rate in the fuel gas circuit from the upper flow rate to a lower flow rate; the lower flow rate corresponds to the minimum fuel gas flow rate suitable for feeding homogeneously the combustor or combustors;

d) stopping the supply of the fuel gas in the fuel gas circuit; i.e. reducing the fuel gas flow rate from the lower flow rate to zero substantially instantaneously;

e) starting the supply of the inert purge media in the inert purge media circuit.

The above steps b)-e) are controlled by the control unit connected to the above mentioned valves arranged along the fuel gas and the inert purge media circuit.

According to the invention, the step e) of starting the supply of the inert purge media in the inert purge media circuit is performed before the step d) of stopping the supply of the fuel gas flow in the fuel gas circuit.

Advantageously, according to the invention there is a temporary parallel supply of fuel gas and of inert purge media to the fuel distribution system. This temporary parallel supply enables a smooth transfer from the fuel gas supply to the inert purge media supply avoiding thermal power swings and the exposure of the gas turbine hardware to sudden high temperature.

According to an embodiment of the invention, the method comprises the step f) of temporary maintaining the fuel gas flow rate in the fuel gas circuit at the above mentioned lower flow rate. In this case, the step d) of starting the supply of the inert purge media in the inert purge media circuit is performed while the fuel gas flow rate is maintained at this lower flow rate.

According to an embodiment of the invention, the inert purge media circuit is provided with an inert purge media control valve. In this case, the method comprises the step g) of rising, preferably ramping up, the inert purge media flow rate in the inert purge media circuit from zero to an upper flow rate.

According to alternative embodiments, the step e) of starting the supply of the inert purge media in the inert purge media circuit and the step f) of temporary maintaining the fuel gas flow rate in the fuel gas circuit at the above mentioned lower flow rate can start at the same time or the step e) can start with a delay with respect to the starting point of the step f).

According to alternative embodiments, the step g) of rising the inert purge media flow rate and the step f) of temporary maintaining the fuel gas flow rate in the fuel gas circuit at the above mentioned lower flow rate can terminate at the same time or the step g) can terminate with a delay with respect to the ending of the step f).

According to alternative embodiments, the method comprises the step h) of maintaining the inert purge media flow rate in the inert purge media circuit at the above mentioned upper flow rate or the step of stopping the supply of the inert purge media, i.e. reducing the inert purge media flow rate from the upper flow rate to zero substantially instantaneously.

Preferably, the supply assembly comprises an air circuit connecting an air source to the fuel distribution system. In this case, the method comprises the step of:

i) reducing, i.e. ramping down, the inert purge media flow rate in the inert purge media circuit from the upper flow rate to zero;

l) starting the supply of air in the air circuit.

According to the above embodiment, the step l) of starting the supply of air in the air circuit is performed during the step i) of reducing the inert purge media flow rate in the inert purge media circuit in order to have a temporary parallel supply of inert purge media and of air to the fuel distribution system.

According to an embodiment of the invention, the supply assembly comprises a differential pressure measuring device configured for measuring the pressure gradient between the inert purge media circuit and the fuel gas circuit. This embodiment ensures that the step of supply of the inert purge media in the inert purge media circuit is performed with an inert purge media pressure higher than fuel gas pressure.

The present invention does not refer only to the above described method but it concerns also a new supply assembly for supplying fuel gas and an inert purge media to a gas turbine combustor. In particular, this supply assembly comprises:

a fuel distribution system connected to at least a combustor;

a fuel gas circuit connecting a fuel gas source to the fuel distribution system and provided with a fuel gas shut off valve and a fuel gas control valve;

an inert purge media circuit connecting an inert purge media source to the fuel distribution system and provided with an inert purge media shut off valve;

a control unit connected to the valve and configured for controlling the fuel gas flow rate in the fuel gas circuit and the inert purge media flow rate in the inert purge media circuit.

Preferably:

the inert purge media circuit comprises an inert purge media control valve;

the supply assembly comprises an air circuit connecting an air source to the fuel distribution system and provided with an air shut off valve;

the supply assembly comprises a differential pressure measuring device configured for measuring the pressure gradient between the inert purge media circuit and the fuel gas circuit;

According to the invention, the control unit is configured for performing the method as foregoing described.

The invention also refers to a gas turbine comprising a rotor; a compressor; at least a combustor; at least a turbine; a supply assembly as foregoing described.

It is to be understood that both the foregoing general description and the following detailed description are exemplary, and are intended to provide further explanation of the invention as claimed. Other advantages and features of the invention will be apparent from the following description, drawings and claims.

The features of the invention believed to be novel are set forth with particularity in the appended claims.

BRIEF DESCRIPTION OF DRAWINGS

Further benefits and advantages of the present invention will become apparent after a careful reading of the detailed description with appropriate reference to the accompanying drawings.

The invention itself, however, may be best understood by reference to the following detailed description of the invention, which describes an exemplary embodiment of the invention, taken in conjunction with the accompanying drawings, in which:

FIGS. 1 and 2 are schematic sectional views of two different examples of gas turbines, in particular sequential gas turbines, which can be provided with the supply assembly according to the invention;

FIG. 3 is a schematic view of a first example of a supply assembly that can perform the method according the invention;

FIGS. 4 and 5 are schematic views of diagrams showing two methods for operating the supply assembly of FIG. 3 according to the prior art practice;

FIG. 6 is a schematic view of a diagram showing an example of a method for operating the supply assembly of FIG. 3 according to the invention;

FIG. 7 is a schematic view of a second example of a supply assembly that can perform the method according the invention; and FIG. 8 is a schematic view of a diagram showing an additional step the method for operating the supply assembly of FIG. 6 according to the invention.

DETAILED DESCRIPTION OF PREFERRED EMBODIMENTS OF THE INVENTION

In cooperation with attached drawings, the technical contents and detailed description of the present invention are described thereinafter according to preferred embodiments, being not used to limit its executing scope. Any equivalent variation and modification made according to appended claims is all covered by the claims claimed by the present invention.

Reference will now be made to the drawing figures to describe the present invention in detail.

Reference is now made to FIG. 1 that is a schematic view of a first example of a sequential gas turbine 1 that can be provided with a supply assembly according to the invention. In particular, FIG. 1 discloses a sequential gas turbine with a high pressure and a low pressure turbine.

Following the main gas flow 2, the gas turbine 1 comprises a compressor 3, a first combustion chamber 4, a high-pressure turbine 5, a second combustion chamber 6 and a low-pressure turbine 7. The compressor 3 and the two turbines 5, 7 are part of a common rotor 8 rotating around an axis 9 and surrounded by a concentric casing 10.

The compressor 3 is supplied with air and is provided with rotating blades 18 and stator vanes 19 configured for compressing the air entering the compressor 3. The compressed air flows into a plenum 11 and from there into a premix burner 12 where this compressed air is mixed with at least one fuel introduced via a first fuel injector supplied by a first fuel supply 13. The fuel/compressed air mixture flows into the first combustion chamber 4 where this mixture are combusted.

The resulting hot gas leaves the first combustor chamber 4 and is partially expanded in the high-pressure turbine 5 performing work on the rotor 8.

Downstream of the high-pressure turbine 5 the gas partially expanded flows into the second burner where fuel is injected via second fuel injector (not shown) supplied by a fuel lance 14.

The partially expanded gas has a high temperature and contains sufficient oxygen for a further combustion that, based on self-ignition, takes place in the second combustion chamber 6 arranged downstream the second burner. The reheated gas leaves the second combustion chamber 6 and flows in the low-pressure turbine 7 where it is expanded performing work on the rotor 8.

The low-pressure turbine 7 comprises a plurality of stages, or rows, of rotor blades 15 arranged in series in the main flow direction. Such stages of blades 15 are interposed by stages of stator vanes 16. The rotor blades 15 are connected to the rotor 8 whereas the stator vanes 16 are connected to a vane carrier 17 that is a concentric casing surrounding the low-pressure turbine 7.

Reference is now made to FIG. 2 that is a schematic view of a second example of a sequential gas turbine 1 that can be provided with a supply assembly according to the invention. In particular, FIG. 2 discloses a sequential gas turbine 20 provided with a compressor 29, one turbine and a sequential combustor arrangement 22. The sequential combustor arrangement 22 of FIG. 2 comprises a first burner 24, a first combustion chamber 25, a second burner 26, and a second combustion chamber 27. The first burner 24, the first combustion chamber 25, the second burner 26 and the second combustion chamber 27 are arranged sequentially in a fluid flow connection. The sequential combustor arrangement 22 can be annular shaped housed in a combustor casing 28 or can be realized in form of a plurality of cans arranged as a ring around the turbine axis. A first fuel is introduced via a first fuel injector (not shown) into the first burner 24 wherein the fuel is mixed with the compressed gas supplied by the compressor 29. A second fuel is introduced into the second burner 26 via a second fuel injector (not shown) and mixed with hot gas leaving the first combustion chamber 25. The hot gas leaving the second combustion chamber 27 expands in the turbine 21 performing work on a rotor 30.

These kind of gas turbines represented in FIGS. 1 and 2, as other kinds not mentioned, comprise a supply assembly for supplying fuel gas and an inert purge media to the combustor or combustors via a fuel distribution system. In particular, the inert purge media is supplied to the fuel distribution system when the fuel gas operation is shut on or off.

FIG. 3 is a schematic view of an example of the above mentioned supply assembly. According to this example, the supply assembly 31 comprises:

- a fuel distribution system 40 in form of a collector and connected to a plurality of fuel lines 41 for feeding a plurality of combustors 42, preferably can combustors arranged around the gas turbine axis;
- a fuel gas circuit 32 connecting a fuel gas source 34 to the fuel distribution system 40 and provided (in series along the fuel gas flow direction) with a fuel gas shut off valve 36 and a fuel gas control valve 38;
- an inert purge media circuit 33 connecting an inert purge media source 35 to the fuel distribution system 40 and provided (in series along the inert purge media direction) with an inert purge media shut off valve 37 and an inert purge media control valve;
- a control unit 43 connected to the valve 36, 37, 38 and configured for controlling the fuel gas flow rate in the fuel gas circuit 32 and the inert purge media flow rate in the inert purge media circuit 33.

As known, a shut off valve is a valve suitable for stopping the supply of the flow whereas the control valve is a valve suitable for reducing or rising, preferably along a linear ramp, the circulating flow rate.

FIGS. 4 and 5 are schematic views of diagrams showing two methods for operating the supply assembly of FIG. 3 according to the prior art practice. In particular, the diagrams of FIGS. 4 and 5 represent the variations in time [t] of the fuel gas and inert purge media (N2) flow rate.

Initially, the shut off valve 37 of the inert purge media circuit 33 is closed and the fuel gas is supplied in the fuel gas circuit 32 at an upper flow rate that correspond to the operation fuel gas flow rate. After this starting point, is represented in FIG. 4 by the number 60, the control unit drives the fuel gas control valve 38 in order to reduce the fuel gas flow rate from the upper rate 60 to a lower rate 46.

This lower rate 46 corresponds to the minimum flow rate suitable to equally distribute the fuel to all combustors and the lowest flow that can be controlled by the control valve 38. The reduction ramp of the fuel gas flow rate is represented in FIG. 4 by the number 45. Once the fuel gas flow rate is reduced to the lower rate 46, the control unit 43 drives the shut off valve 36 of the fuel gas circuit 32 in order to stop, almost immediately, the fuel gas flow. Only after this stopping, in particular after a delay represented in figure by the reference Δt, the control unit 43 drives the opening of the shut off valve 37 of the inert purge media circuit 33. If the inert purge media circuit 33 is not provided with any control valve, the inert purge media flow rate rises immediately to an upper flow rate represented in FIG. 4 by the reference 49. This upper flow rate corresponds to the minimum flow for equally distributing the inert purge media inside the fuel distribution system 40. The purge media flow rate can be maintained, reference 51 in FIG. 4, or the control unit 43 can drive the closing of the shut off valve 37 in order to reduce, almost immediately, the purge media flow rate to zero. FIG. 5 discloses a similar diagram wherein the inert purge media circuit 33 is provided with a control valve 39. In this case, the control unit 43 drives the control valve 39 in order to rise the inert purge media flow rate along a linear ramp indicated in FIG. 5 by the reference 52. This latter example has the advantage that the residual fuel in the fuel distribution system is not pushed inside the combustors.

According both the described prior art diagrams, the time between the shut off of the fuel gas and the starting of the supply of the inert purge media is critical. Indeed, during this delay recirculating hot gas can start a chemical/thermal reaction inside the fuel distribution system 40. The resulting heat can produce damage in the gas turbine hardware.

FIG. 6 is a schematic view of a diagram showing an example of a method for operating the supply assembly of FIG. 3 according to the invention. According to this example, once the fuel gas flow rate has been reduced to the lower rate 46, the control unit 43 drives the valves 36 38 of the fuel gas circuit 32 in order to maintain this lower rate 46. According the invention, the control unit 43 drives the valves 37 39 of the inert purge media circuit 33 in order to start the supply of the inert purge media while the fuel gas is still circulating in the fuel gas circuit 32 at the above mentioned lower rate 46. The starting point of the supply of the inert purge media is represented in FIG. 6 by the reference 48. In this example, the control unit 43 drives the closing of the fuel gas shut off valve 36, closing represented in FIG. 6 by the reference 47, prior that the inert purge media flow rate arrives to the upper rate 49.

In order to avoid contamination by the fuel gas in the inert purge media circuit 33, the pressure of the inert purge media supply has to be sufficiently high with respect to the fuel gas pressure. In view of the above, the figure discloses a supply assembly 31 provided with a differential pressure measuring device 44 configured for measuring the pressure gradient between the inert purge media circuit 33 and the fuel gas circuit 32 and connected to the control unit 43. The embodiment of FIG. 7 moreover discloses an air circuit 54 connecting an air source 55 to the fuel distribution system 40 and provided with an air shut off valve 56 connected to the control unit 43.

This embodiment allows to supply air to the fuel distribution system 40 after the inert purge media operation while the fuel gas circuit 32 is maintained closed.

FIG. 8 is a schematic view of a diagram showing the variations in time [t] of the air and the inert purge media (N2) flow rate.

In particular, the control unit 43 drives the valves 37 39 of the inert purge media circuit 33 in order to reduce, along a linear ramp, the inert purge media flow rate from the upper flow rate 49 to zero. The starting point of this reduction is represented in FIG. 8 by the reference 50 and the linear ramp by the reference 53. According to FIG. 8, the control unit 43 drives the air shut off valve 56 in order to start the supply of the air during the flow rate reduction of the inert purge media flow. According to this example, the starting point of the air supply is represented in FIG. 8 by the reference 57 whereas the reference 58 represents the upper flow rate of the air supply.

The present invention as described allows to overcome the drawbacks of the prior art. Indeed the present invention involves at least the following advantages:
- there is no time without forward flow during the transfer from fuel gas to inert purge media operation;
- in case of a malfunction of the inert purge media circuit the fuel gas operation is still in operation and therefore no emergency actions are required;
- sudden thermal jumps due to the stepwise shut off of the fuel gas flow are mitigated.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. Method for operating a supply assembly configured for supplying fuel gas and an inert purge media to at least one gas turbine combustor, the method comprising:
  a) providing the supply assembly having a fuel distribution system connected to the at least one gas turbine combustor, a fuel gas circuit and an inert purge media circuit connecting a fuel gas source and an inert purge media source, respectively, to the fuel distribution system, and a control unit configured for controlling a fuel gas flow rate in the fuel gas circuit and an inert purge media flow rate in the inert purge media circuit;
  b) supplying the fuel gas in the fuel gas circuit with an upper fuel gas flow rate;
  c) reducing the fuel gas flow rate in the fuel gas circuit from the upper fuel gas flow rate to a lower fuel gas flow rate;
  d) temporarily maintaining the fuel gas flow rate in the fuel gas circuit at the lower fuel gas flow rate;
  e) stopping the supply of the fuel gas in the fuel gas circuit; and
  f) starting a supply of the inert purge media in the inert purge media circuit, wherein the step f) of starting of the supply of the inert purge media in the inert purge media circuit is performed before the step of stopping the supply of the fuel gas flow in the fuel gas circuit in order to have a temporary parallel supply of fuel gas and of inert purge media to the fuel distribution system, and
  wherein the step f) of starting the supply of the inert purge media in the inert purge media circuit is performed while the fuel gas flow rate is maintained at the lower fuel gas flow rate in step d).

2. Method as claimed in claim 1, wherein the inert purge media circuit is provided with an inert purge media control valve, the method comprising:

g) raising the inert purge media flow rate in the inert purge media circuit from zero to an upper inert purge media flow rate.

3. Method as claimed in claim 2, wherein the step d) and the step f) start at a same time.

4. Method as claimed in claim 2, wherein the step f) starts with a delay with respect to a starting point of the step d).

5. Method as claimed in claim 2, wherein the step g) and the step d) end at a same time.

6. Method as claimed in claim 2, wherein the step g) ends with a delay with respect to an ending point of the step d).

7. Method as claimed in claim 2, comprising:
h) maintaining the inert purge media flow rate in the inert purge media circuit at the upper inert purge media flow rate.

8. Method as claimed in claim 7, wherein the supply assembly includes an air circuit connecting an air source to the fuel distribution system, the method comprising:
i) reducing the inert purge media flow rate in the inert purge media circuit from the upper inert purge media flow rate to zero; and
l) starting a supply of air in the air circuit,
wherein the step l) of starting the supply of air in the air circuit is performed during the step i) of reducing the inert purge media flow rate in the inert purge media circuit in order to have a temporary parallel supply of inert purge media and of air to the fuel distribution system.

9. Method as claimed in claim 1, wherein the supply assembly includes a differential pressure measuring device configured for measuring a pressure gradient between the inert purge media circuit and the fuel gas circuit, the step e) of supplying the inert purge media in the inert purge media circuit being performed with an inert purge media pressure higher than a fuel gas pressure.

10. Supply assembly for supplying fuel gas and an inert purge media to at least one gas turbine combustor, the supply assembly comprising:
a fuel distribution system connected to the at least one gas turbine combustor;
a fuel gas circuit connecting a fuel gas source to the fuel distribution system and provided with a fuel gas shut off valve and a fuel gas control valve;
an inert purge media circuit connecting an inert purge media source to the fuel distribution system and provided with an inert purge media shut off valve;
a control unit connected to the fuel gas shut off valve, fuel gas control valve, and inert purge media shut off valve and configured for controlling a fuel gas flow rate in the fuel gas circuit and an inert purge media flow rate in the inert purge media circuit, the control unit being configured for performing a method which includes:
supplying the fuel gas in the fuel gas circuit with an upper fuel gas flow rate;
reducing the fuel gas flow rate in the fuel gas circuit from the upper fuel gas flow rate to a lower fuel gas flow rate;
temporarily maintaining the fuel gas flow rate in the fuel gas circuit at the lower fuel gas flow rate;
stopping the supply of the fuel gas in the fuel gas circuit; and
starting a supply of the inert purge media in the inert purge media circuit,
wherein the starting of the supply of the inert purge media in the inert purge media circuit is performed before the stopping of the supply of the fuel gas flow in the fuel gas circuit in order to have a temporary parallel supply of fuel gas and of inert purge media to the fuel distribution system, and
wherein the step of starting the supply of the inert purge media in the inert purge media circuit is performed while the fuel gas flow rate is maintained at the lower fuel gas flow rate.

11. Supply assembly as claimed in claim 10, wherein the inert purge media circuit comprises:
an inert purge media control valve, the control unit being configured for raising the inert purge media flow rate in the inert purge media circuit from zero to an upper inert purge media flow rate.

12. Supply assembly as claimed in claim 11, wherein the supply assembly comprises:
an air circuit connecting an air source to the fuel distribution system and provided with an air shut off valve, the control unit being configured for:
reducing the inert purge media flow rate in the inert purge media circuit from the upper inert purge media flow rate to zero; and
starting a supply of air in the air circuit,
wherein the starting of the supply of air in the air circuit is performed during the reducing of the inert purge media flow rate in the inert purge media circuit in order to have a temporary parallel supply of inert purge media and of air to the fuel distribution system.

13. Supply assembly as claimed in claim 12, wherein the supply assembly comprises:
a differential pressure measuring device configured for measuring a pressure gradient between the inert purge media circuit and the fuel gas circuit, the control unit being configured for:
supplying of the inert purge media in the inert purge media circuit with an inert purge media pressure higher than a fuel gas pressure.

14. A gas turbine comprising:
a rotor;
a compressor;
at least one combustor;
at least a turbine; and
a supply assembly for supplying a fuel gas and an inert purge media to the at least one combustor;
the supply assembly being configured as claimed in claim 10.

* * * * *